Nov. 18, 1958    H. WALKER    2,860,380
METHOD OF MOLDING THERMOSETTING SYNTHETIC
MATERIALS WITH SURFACE DECORATION
Filed July 5, 1957
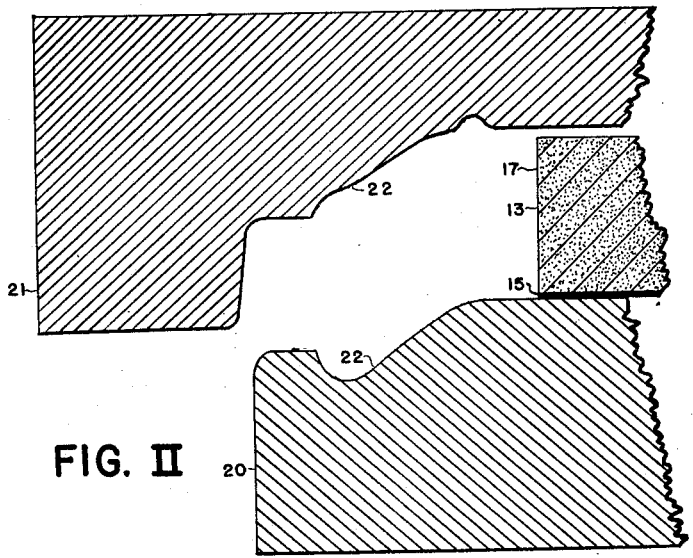
FIG. II
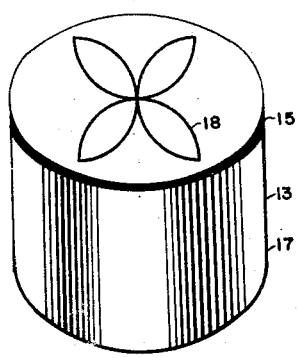
FIG. I
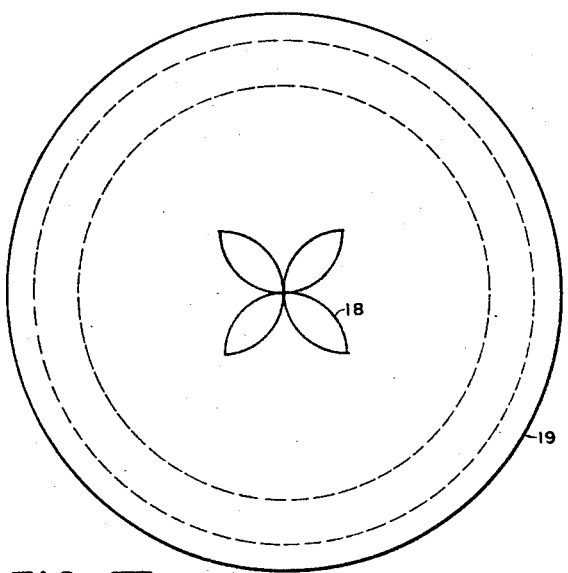
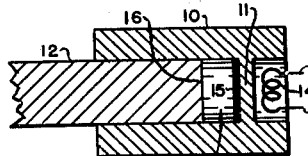
FIG. IV    FIG. III
INVENTOR.
HAROLD WALKER
BY
Peter L. Tailer
AGT.

United States Patent Office 2,860,380
Patented Nov. 18, 1958

2,860,380

METHOD OF MOLDING THERMOSETTING SYNTHETIC MATERIALS WITH SURFACE DECORATION

Harold Walker, New York, N. Y.

Application July 5, 1957, Serial No. 670,309

5 Claims. (Cl. 18—61)

This invention relates to an improved method of molding thermosetting synthetic resin molding powders, and in particular is concerned with the production of designs for the surface of molded articles.

It is common practice in the compression molding of articles to form the charges of molding material in a preforming machine. This machine receives the molding material in powder form and compresses it without heat at pressures up to 3,000 pounds per square inch into cylindrical cakes or pills which consist of the correct amount of molding material to charge the mold cavity. These pills may then be either pre-heated or not and placed into the mold cavity which is maintained at a temperature of from 300 degrees F. to 320 degrees F. to be molded at a mold pressure of from 2,500 to 4,000 pounds per square inch. The mold is left closed until the molded article is cured whereon the mold is opened and the completed article is removed and de-flashed.

Decoration may be applied by transfer or printing to the surface of such a finished article, however this is unsatisfactory as the decoration will tend to wear or peel away as the article receives abuse such as undergoing repeated washings. United States Patent No. 2,646,380 discloses the method of molding an article from a thermosetting molding powder and then applying a design to absorbent paper, impregnating the paper with a synthetic resin, opening the mold before the molded article is completely cured, applying the impregnated sheet to the surface to be decorated, and closing the mold to complete the curing of the article. Such use of decorative overlays are now common in the industry, however the molds must always be opened during the molding cycle to place the overlay on the incompletely cured article. When the mold is thus opened during the cycle, time is lost and articles are spoiled when, as often happens, contaminates or flash fall into the opened mold cavity. If, to overcome this lost time and spoilage, the overlay is placed in the mold cavity with the preformed pill at the start of the molding cycle so the mold will not have to be opened, the flow of plastic during molding will distort, tear, or otherwise destroy the overlay.

An object of this invention is to provide a method whereby an overlay may be placed in a compression mold cavity with the pill at the start of the molding cycle.

Another object of this invention is to provide a method whereby an overlay may be placed in a mold cavity to form a design or decoration molded into a molded article without having to open the mold during the molding cycle.

A further object of this invention is to provide a method whereby unique and superior designs and decorations may be more inexpensively formed on and cured into the surface of molded articles.

Additional objects, advantages and features of invention reside in the practice of the invention and the embodiments of its elements otherwise as will be understood from the accompanying drawings wherein:

Fig. I is a perspective view of a pre-formed pill adapted to be placed in a mold cavity;

Fig. II is a vertical section through a fragment of an opened compression mold with a fragment of a pre-formed pill shown in position in the mold cavity;

Fig. III is a top view of a molded article; and

Fig. IV is a longitudinal section through a pre-forming machine with a formed pill shown in position.

Referring to the drawings in detail, the process that is the subject of this invention is carried through as follows. As shown in Fig. IV, a pre-forming machine consists basically of a cylindrical wall portion 10 closed at one end with the end plate 11. The broken away plunger 12 is moved into the cylindrical cavity formed by the wall portion to compress molding powders placed in this cavity into the pill 13. The molding powders or material may be any synthetic resin molding powder such as the Melmac quality melamine molding powders available from the American Cyanamid Company, Plastics and Resins Division, of 30 Rockefeller Plaza, New York city. The pre-forming machine used in the practice of this invention is slightly modified. The end plate 11 is heated to about 300 degrees F. by the electrical heating element 14 from which there extend the leads 9. This heated end plate 11 partially cures the end portion 15 of the pill 13 during the normal cycle of the pre-forming machine. The pill is then removed or ejected by standard means from the pre-forming machine. If it is considered desirable, the face 16 of the plunger 12 may be heated rather than the end plate 11 to partially cure one portion of the pill.

As shown in Fig. I, the body 17 of the pill 13 is formed from the coarse, granular compressed molding powders while the thin partially cured end portion 15 is smooth and solid as the heat applied to this area in the pre-forming machine has rendered the powders plastic to flow together and become partially cured. This end portion may then have the design 18 placed upon it in a number of ways. The design may be printed, screened, rubber stamped or otherwise placed on the pill, the design may or may not be then covered with a clear overlay, or a decorative overlay such as that described in the forementioned United States Patent may be placed on the pill. Any suitable pigment or ink may be used such as slow-drying lithographic ink that is oil-bound. Other methods of applying the design may be devised such as hand painting, spraying, or spattering.

Depending on the nature of the piece being molded and on the molding powders being used, the pill may be pre-heated before being placed in the mold cavity 22 as shown in Fig. II. The mold shown is a flash type mold having the two cooperating parts 20 and 21. As in the usual practice, the mold cavity is heated between 300 to 320 degrees F. As the mold closes, the already cured end portion 15 of the pill 13 will not flow within the mold and it will remain stationary relative to the surface of the mold against which it rests. The un-cured body portion 17 of the pill will flow in the heated mold cavity about the partially decorated end portion to form the article which then remains in the mold until the end portion and the article are completely cured and indistinguishable from each other. Because the end portion does not move relative to the mold, the decorated portion is not distorted and the overlays are not disturbed in any way.

When the mold is opened, the finished article is removed and de-flashed. Fig. III shows the finished article 19, in this case a dinner plate, with the design 18 formed on and cured into its surface without the interruption of the molding cycle. Radio nobs, cups, and many other articles may be made in this manner. In the case of radio nobs, direct printing on the pill without any protective overlay is adequate because the design or printing on the front of the nob does not receive much wear. In addition, the continued curing of the partially cured end portion after printing upon it tends to better set the ink or pigment used. Draw possibilities are not limited if the end portion is printed upon and placed in a mold where the end portion has to conform with some curvatures. Such draw possibilities are completely limited in the use of conventional overlays applied during the interruption of the molding cycle.

In summing up the advantages of this method, there is no appreciable increase in the time needed to pre-form the pills, the molding process is speeded up as the molding cycle is not interrupted, the spoilage of molded articles is reduced, and superior decoration may be applied to the surface of the molded articles.

While I have disclosed my invention in the best form known to me, it will nevertheless be understood that this is purely exemplary and that modifications in the construction, arrangement, and combination of parts, substitution of materials and of equivalents mechanically and otherwise, may be made without departing from the spirit of the invention, except as it may be limited in the appended claims wherein I claim:

1. A method of molding an article from a thermo-setting molding powder and applying a design to the article, comprising heating a portion of the interior of a pre-forming machine, forming a pill from molding powder in the pre-forming machine while the heated portion of the interior of the pre-forming machine partially cures a portion of the surface of the pill, removing the pill from the pre-forming machine, applying a design to the partially cured surface portion of the pill, placing the pill in a heated mold so that the partially cured portion of the surface of the pill will come into contact with a surface of the mold, closing the mold to mold the article, leaving the mold closed until the article is completely cured, opening the mold, and removing the finished article.

2. A method of molding an article from a thermosetting molding powder and applying a design to the article, comprising heating a portion of the itnerior of a pre-forming machine, forming a pill from molding powder in the pre-forming machine so that the heated portion of the interior of the pre-forming machine partially cures a portion of the surface of the pill, removing the pill from the pre-forming machine, applying a design to the partially cured surface portion of the pill, placing the pill in the heated cavity of a mold with the partially cured surface portion of the pill and the design adjacent to a substantially horizontal portion of the mold cavity, closing the mold to mold the article, leaving the mold closed until the whole article is completely cured, opening the mold, and removing the finished article.

3. A method of molding an article from a thermosetting molding powder and applying a design to the article, comprising heating a portion of the interior of a pre-forming machine, forming a pill from molding powder in the pre-forming machine while the heated portion of the interior of the pre-forming machine partially cures a portion of the surface of the pill, removing the pill from the pre-forming machine, applying a design to the partially cured surface portion of the pill, placing the pill in the heated cavity of a mold with the partially cured surface portion of the pill and the design adjacent to a substantially horizontal portion of the mold cavity, closing the mold to mold the article so that the partially cured surface portion of the pill and the applied design remain stationary relative to the mold while the body portion of the pill flows about the partially cured portion of the pill to form the article, leaving the mold closed until the whole article is completely cured, opening the mold, and removing the finished article.

4. A method of molding an article from a thermosetting molding powder and applying a design to the article comprising heating a portion of the interior of a pre-forming machine, forming a cylindrical pill from molding powder in the pre-forming machine while the heated portion of the interior of the pre-forming machine partially cures one end of the pill, removing the pill from the pre-forming machine, applying a design to the partially cured end portion of the pill, placing the pill in the heated cavity of a mold with the partially cured end portion and the design adjacent to a substantially horizontal portion of the mold cavity, closing the mold to mold the article so that the partially cured end portion of the pill and the applied design remain stationary relative to the mold while the body portion of the pill flows about the partially cured portion to form the article, leaving the mold closed until the whole article is completely cured, opening the mold, and removing the finished article.

5. A method of molding an article from thermosetting molding powders and applying a design to the article as claimed in claim 4 wherein an overlay is applied with the design to the partially cured end portion of the pill.

References Cited in the file of this patent

UNITED STATES PATENTS

| | | |
|---|---|---|
| Re. 19,549 | Byck | Apr. 30, 1935 |
| 2,386,891 | Gregory | Oct. 16, 1945 |